United States Patent [19]
Lu

[11] Patent Number: 5,492,121
[45] Date of Patent: Feb. 20, 1996

[54] METHOD FOR REDUCING SIDELOBES OF LIMITED DIFFRACTON PULSE-ECHO IMAGES

[75] Inventor: Jian-Yu Lu, Rochester, Minn.

[73] Assignee: Mayo Foundation for Medical Education and Research, Rochester, Minn.

[21] Appl. No.: 409,567

[22] Filed: Mar. 24, 1995

[51] Int. Cl.$^6$ ........................................................ A61B 8/00
[52] U.S. Cl. .......................................... 128/653.1; 367/103
[58] Field of Search ......................... 128/653.1, 661.01; 73/624, 625, 626; 342/130, 131, 132, 111; 310/369, 334; 367/103, 104, 105, 153, 155

[56] References Cited

U.S. PATENT DOCUMENTS

| | | | |
|---|---|---|---|
| 4,495,817 | 1/1985 | Hunt et al. | 73/624 |
| 4,784,147 | 11/1988 | Moshfeghi | 128/653.1 |
| 5,309,161 | 5/1994 | Urkowitz et al. | 342/132 |

OTHER PUBLICATIONS

*Experimental Verification of Nondiffracting X Waves*, IEEE Transactions On Ultrasonics, Ferroelectrics, and Frequency Control, vol. 39, No. 3, pp. 441–446, May 1992, Lu, et al.
*Nondiffracting X Waves–Exact Solutions to Free–Space Scalar Wave Equation and Their Finite Aperture Realizations*, IEEE Transactions On Ultrasonics, Ferroelectrics, and Frequency Control, vol. 39, No. 1, pp. 19–31, Jan. 1992, Lu, et al.
*Sidelobe Reduction for Limited Diffraction Pulse–Echo Systems*, IEEE Transactions on Ultrasonics, Ferroelectrics, and Frequency Control, vol. 40, No. 6, pp. 735–746, Nov. 1993, Lu et al.
*A Study of Two–Dimensional Array Transducers for Limited Diffraction Beams*, IEEE Transactions on Ultrasonics, Ferroelectrics, and Frequency Control, vol. 41, No. 5, pp. 724–739, Sep. 1993, Lu et al.
*Biomedical Ultrasound Beam Forming*, Ultrasound in Med. & Biol., vol. 20, No. 5 pp. 403–428, 1994, Lu, et al.
*In Vitro and In Vivo Real–time Imaging With Ultrasonic Limited Diffraction Beams*, IEEE Transactions on Medical Imaging, vol. 12, No. 4, Dec. 1993, Lu et al.
*A Study of Sidelobe Reduction for Limited Diffraction Beams*, 1993 Ultrasonics Symposium, pp. 1077–1082, Lu et al.

Primary Examiner—George Manuel
Attorney, Agent, or Firm—Quarles & Brady

[57] ABSTRACT

An acoustic transducer produces a limited diffraction beam during the transmit portion of a pulse-echo sequence that has sidelobes extending away from the beam axis in defined sectors. During the receive portion of the pulse-echo sequence a receive aperture for a limited diffraction beam is employed having sidelobes extending away from the beam axis in defined sectors that do not overlap the transmit sidelobes. Both limited diffraction Bessel beams and limited diffraction X waves are employed, and an acoustic transducer producing tenth derivative X waves is described.

12 Claims, 5 Drawing Sheets

METHOD FOR REDUCING SIDELOBES OF LIMITED DIFFRACTON PULSE-ECHO IMAGES

"This invention was made with United States Government support awarded by the National Institute of Health (NIH), Grant Nos. CA-54212 and CA-43920. The United States Government has certain rights in this invention."

BACKGROUND OF THE INVENTION

The field of the invention is ultrasonic transducers which radiate ultrasonic waves into the body of a patient and which receive and detect ultrasonic waves emanating from the body of a patient.

Ultrasonic transducers for medical applications are constructed from one or more piezoelectric elements which are sandwiched between a pair of electrodes. Such piezoelectric elements are typically constructed of lead zirconate titanate (PZT), polyvinylidene diflouride (PVDF), or PZT ceramic/polymer composite. The electrodes are connected to a voltage source, and when a voltage is applied, the piezoelectric elements change in size at a frequency corresponding to that of the applied voltage. When a voltage pulse having an ultrasonic frequency is applied, the piezoelectric element emits an ultrasonic wave in the media to which it is coupled. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is disposed to the rear of the piezoelectric element to absorb ultrasonic waves that emerge from the back side of the element so that they do not interfere.

When used for ultrasonic imaging, the transducer has a number of piezoelectric elements arranged in an array and driven with separate voltages (apodizing). By controlling the phase of the applied voltages, the ultrasonic waves produced by the piezoelectric elements combine to produce a net ultrasonic wave which is focused at a selected point. This focal point can be moved in an azimuthal plane to scan the subject. However, objects which are not at this focal plane are out of focus their resolution in the reconstructed image is reduced. Thus, conventional ultrasonic transducers focus the wave providing very high resolution images of objects lying at or near the focal plane, but have increasingly lower resolution of objects lying to either side of this plane. Such transducers are said to have high resolution, but low depth of field.

Nondiffracting solutions to the wave equation have been discovered and extensively tested using electromagnetic waves and ultrasonic waves. Under ideal conditions, these solutions indicate that transducers can produce a wave that is confined to a beam that does not diffract, or spread, over a long distance. Such nondiffractive beams produce a much greater depth of field than other focused beams. In practice, such beams do eventually diffract due to the less-than-ideal transducers and propagating media, and the phrase "limited diffraction beams" has been coined for this class of beams.

In U.S. Pat. No. 5,081,995, an ultrasonic transducer is described which produces one well-known type of limited diffraction beam, which was first discovered by J. Durnin and described in an article entitled "Exact Solutions for Nondiffracting Beams. 1. The Scalar Theory", published in the *Journal of Optical Society of America*, 4(4):651–654 in April, 1987. This limited diffraction beam is referred to as a "Bessel beam" because its lateral beam profile is a Bessel function.

More recently, another type of limited diffraction beam was discovered by J-y. Lu and J. Greenleaf and described in an article "Nondiffracting X waves—exact solutions to free-space scalar wave equation and their finite aperture realizations", *IEEE Trans. Ultrason. Ferroelec., Freq. Contr.*, Vol. 39, pp. 19– 31, January 1992. This beam has an x-like shape in a plane along the wave axis and it has been termed "X waves". The X waves are nonspreading in both transverse and axial directions and have a large depth of field even when they are produced by a transducer of finite aperture.

Figure 1:
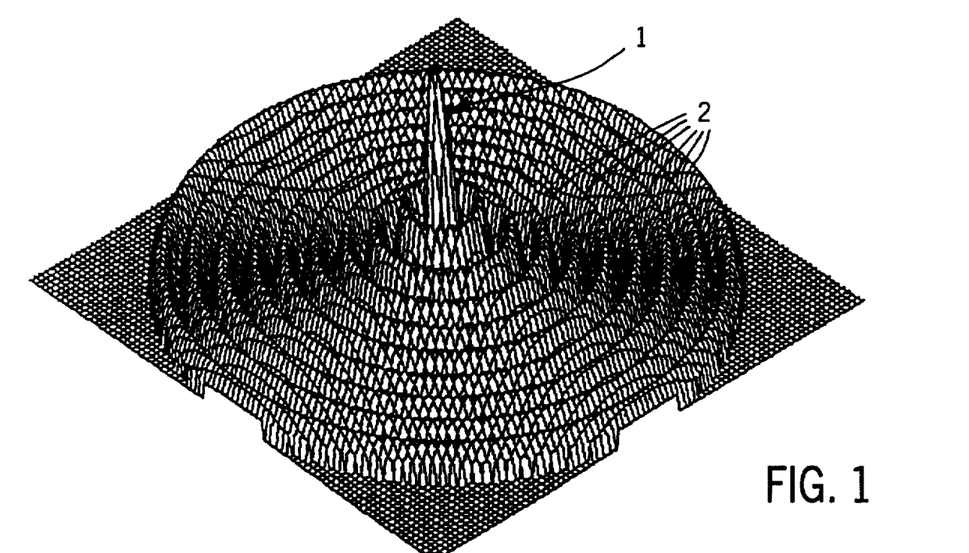
FIG. 1 is a three-dimensional representation of a Bessel beam.
Figure 2:
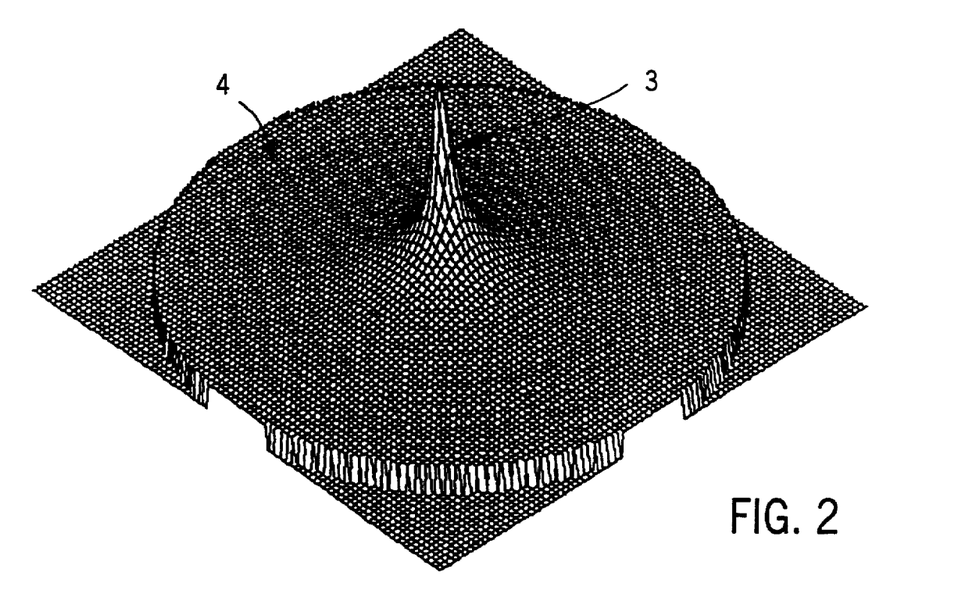
FIG. 2 is a three-dimensional representation of an X wave.

Although limited diffraction beams have a large depth of field, they also have relatively high sidelobes. When viewed along the propagation axis, most of the beam intensity is focused near that axis, but a significant amount of energy is delivered to regions around the focal point. Each type of focussed bean has its own distinctive pattern of these "sidelobes". As shown in FIG. 1 for example, the Bessel beam has an intense, focused beam 1 at the beam axis, and surrounding sidelobes which vary sinusoidally in intensity as a function of radial distance from the propagation axis. These sidelobes appear as a set of surrounding annular rings 2 of varying intensity. As shown in FIG. 2, the X beam also has an intense, focused beam 3 at the beam axis, but its surrounding sidelobes 4 taper off in intensity smoothly as a function of radial distance from the beam axis. A common characteristic of the sidelobes on both of these beam types is their symmetry throughout 360° around the axis of propagation. Stated another way, the intensity of the sidelobes is independent of angular location around the propagation axis.

High sidelobes hinder the performance of limited diffraction beams. In ultrasonic medical imaging, for example, the echo make it more difficult to detect low scattering objects such as signals that result from the sidelobes reduce image contrast as small cysts. High sidelobes also increase the effective sampling volume, thus lowering the image resolution in tissue characterization.

High sidelobes are not unique to limited diffraction beams and much effort has been made in the past to reduce their deleterious effects on image quality. For example, Burckhardt et al. describe in an article "Focussing ultrasound over a large depth with an annular transducer—an alternative method", *IEEE Trans. Sonics Ultrason.*, SU-22, No. 1, pp. 11–15, January 1975, cutting a ring transducer into eight or more equal segments and arranging the segments into two orthogonal groups. One group is used to transmit and the other to receive. The whole geometry is rotated to repeat the process and the resulting signals are added to the previously received signals. This method reduces the sidelobes of the ring to some extent. Macovski et al. describe in an article, "High-resolution B-scan systems using a circular array," *Acoustic Holography*, Vol. 6, N. Booth, Editor, pp. 121– 143, 1975, weighting a ring transducer with the powers of the cosine and sine functions to transmit and receive, respectively. This results in sidelobe reductions in two orthogonal directions of the ring but leaves high sidelobes in other directions. Moshfeghi, describes in an article "Sidelobe suppression in annular array and axicon imaging systems," *J. Acoust. Soc. Am.*, Vol. 83, No. 6, pp. 2202–2209, June, 1988, transmitting and receiving with different aperture sizes. However, this method does not reduce the sidelobes significantly.

A summation-subtraction method to reduce the sidelobes of the pulse-echo responses of limited diffraction ultrasonic beams has been developed by J-y. Lu and J. Greenleaf, "Sidelobe reduction for limited diffraction pulse-echo systems," *IEEE Trans. Ultrason. Ferroelec. and Freq. Cont.*, Vol. 40, No. 6, pp. 735–746, November, 1993; "A study of sidelobe reduction for limited diffraction beams," *IEEE 1993 Ultrason. Symp. Proc.* 93CH3301-9, Vol. 2, pp. 1077–1082, 1993. This method has also been used successfully on other types of focused beams. The problem with it is that the final signals have a small dynamic range due to the subtraction of larger signals. Also, the method requires multiple transmissions that lower the image frame rate resulting in blurred images of moving objects such as the heart. Other methods for reducing the sidelobes of limited diffraction beams, such as deconvolution have been studied by J-y. Lu and J. Greenleaf, "Sidelobe reduction of nondifracting pulse-echo images by deconvolution," *Ultrason. Imag.*, Vol. 14, No. 2, p. 203, April 1992 (Abs), and dynamic focused reception have also been suggested. These are reviewed by J-y. Lu, H-h. Zou, and J. Greenleaf in an article, "Biomedical ultrasound beam forming," *Ultrasound Med. Biol.*, Vol. 20, No. 5, pp. 403–428, July, 1994.

SUMMARY OF THE INVENTION

The present invention is a method for performing a pulse-echo sequence with a limited diffraction beam or wave such that signals due to sidelobes are suppressed. More specifically, the method includes transmitting a limited diffraction wave along a propagation axis through a propagation medium with a transmit aperture that produces a wave having an intensity which is maximum in a focal region around the propagation axis and having sidelobes which are of less intensity than the focal region and which vary substantially in intensity as a function of angle around the propagation axis; and receiving an echo signal propagating in the medium along the propagation axis with a limited diffraction receive aperture that is most receptive to the echo signal in the focal region around the propagation axis and which is less receptive to echo signals in sidelobes, and the receptivity in the sidelobes varies substantially as a function of angle around the propagation axis. The angular orientation of the transmit aperture and the receive aperture are oriented such that their respective sidelobes are positioned for minimum spatial overlap.

A general object of the invention is to reduce the deleterious effects of sidelobes associated with limited diffraction beams/waves. The sidelobes associated with the receive aperture are oriented such that they do not overlap the sidelobes produced by the transmit aperture. As a result, although sidelobes are produced when the beam/wave is transmitted they are not seen at the output of the receiver which is responsive to sidelobes containing very little echo signal. Both the transmit and receive apertures strongly correspond in the focal region around the propagation axis, however, to efficiently produce a strong echo signal having minimal sidelobes.

Another general object of the invention is to produce acoustic transducers having limited diffraction transmit and receive apertures in which sidelobes are substantially confined to angular sectors around the propagation axis. This is achieved by constructing a transducer from an aperture weighting function that is derived by taking the derivative of a limited diffraction solution of the wave equation along an axis perpendicular to the propagation axis. Higher order derivatives may be used and the derivative may be taken along a second axis as well without altering the limited diffraction nature of the resulting beam/wave.

Another object of the invention is to reduce the response to sidelobes without reducing the frame rate or the dynamic range of the received signals. There is no need for repetitive pulse-echo sequences in which the signals are combined in some manner to reduce sidelobes. Similarly, since no subtraction of receive signals is required, the full dynamic range of received signals is employed in the reconstructed image.

While the present invention is particularly applicable to ultrasonic medical imaging, the principles also have other applications. For example, the principles of this invention nay be applied to ultrasonic nondestructive evaluation (NDE) of materials, under water acoustics, seismic imaging, radar, and electromagnetic imaging.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

A three-dimensional isotropic/homogeneous scalar wave equation in cylindrical coordinates is given by $$\left[ \frac{1}{r} \frac{\partial}{\partial r} \left( r \frac{\partial}{\partial r} \right) + \frac{1}{r^2} \frac{\partial^2}{\partial \phi^2} + \frac{\partial^2}{\partial z^2} - \frac{1}{c^2} \frac{\partial^2}{\partial t^2} \right] \Phi = 0, \quad (1)$$

where $r=\sqrt{x^2+y^2}$ is radial distance, $\phi=\tan^{-1}(y/x)$ is azimuthal angle, z is the axial propagation axis that is perpendicular to the plane defined by r and $\phi$, t is time, c is the speed of sound or light and $\Phi$ represents acoustic pressure or the Hertz potential that is expressed as a function of r, $\phi$, z and t.

The solution to this equation for the previously discovered X waves is as follows:

$$\Phi_{X_n}(r,\phi,z-c_1t) = \quad (2)$$

$$e^{in\phi} \int_0^\infty B(k)J_n(kr\sin\zeta)e^{-k[a_0-i(z\cos\zeta-ct)]}dk, \ (n=0,1,2,\ldots)$$

and the solution for Bessel beams is as follows:

$$\Phi_{J_n}(r,\phi,z-c_1t)=J_n(\alpha r)e^{i(\beta z-\omega t+n\phi)}, \ (n=0,1,2,\ldots), \quad (3)$$

where the subscripts "X" and "J" represent X waves and Bessel beams, respectively, n is a nonnegative integer, $c_1$ is phase velocity ($c_1=c/\cos\zeta$ for X waves and $c_1=\omega/\beta$ for Bessel beams), where $\omega$ is angular frequency, $\zeta$ is an Axicon angle that is a constant for a given X wave, and $\beta=\sqrt{k^2-\alpha^2}$ is a propagation constant of Bessel beams, where $k=\omega/c$ is wavenumber and $\alpha$ is a scaling factor that controls the lateral resolution (or main beam width) of Bessel beams. $J_n$ is the nth-order Bessel function of the first kind, $a_O$ is a constant that determines the decay speed of the high-frequency components of X waves, and B(k) is any well-behaved function of k and could represent the transfer functions of practical radiators (antennas or acoustic transducers). The X waves defined by equation (2) and the Bessel beams defined by equation (3) are exact solutions to the wave equation (1). They are limited diffraction beams because they are explicit functions of the propagation term, $z-c_1t$. If $z-c_1t$= constant (traveling with the waves), $\Phi_{X_n}$ and $\Phi_{J_n}$ are not functions of z and t. This means that $\Phi_{X_n}$ and $\Phi_{J_n}$ represent waves that will propagate to infinite distance without changing their wave shapes.

As shown in FIG. 1, when n=0 most of the acoustic pressure or Hertz potential in a Bessel beam is focused at 1 along the axis of propagation, and the sidelobes 2 are symmetric about the axis of propagation. Similarly, when n=0 most of the acoustic pressure or Hertz potential of an X wave is focused along the axis of propagation as shown in FIG. 2 at 3, and its sidelobes are also symmetrical. A discovery of the present invention is that limited diffraction beams can be produced which focus most of their acoustic pressure or Hertz potential along the propagation axis, but which produce sidelobes that are angularly dependant. This angular dependence is exploited by the pulse-echo sequence of the present invention to substantially reduce the deleterious effects of sidelobes.

Figure 3:
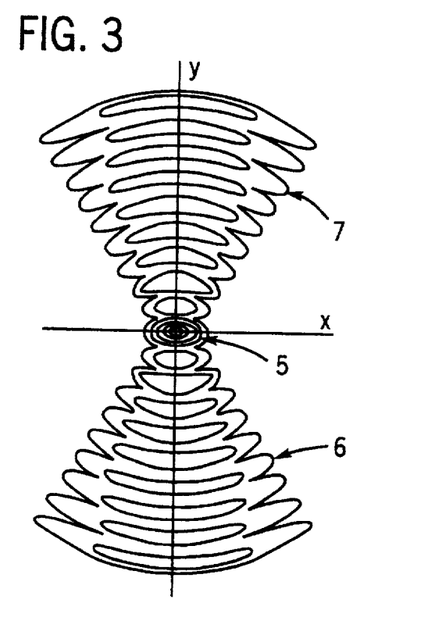
FIG. 3 is a contour plot of the fourth derivative of a Bessel beam as seen along its axis of propagation.
Figure 4:
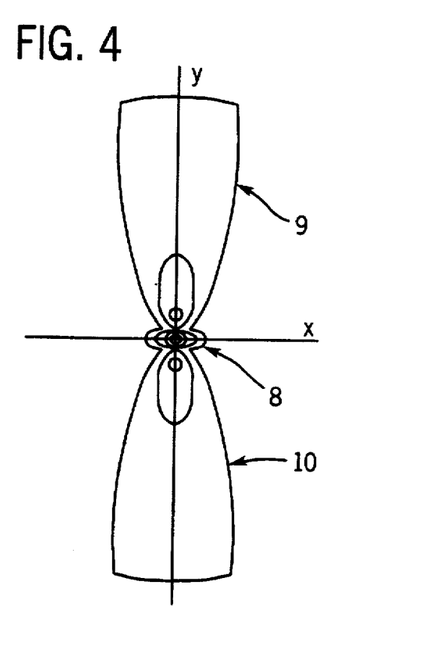
FIG. 4 is a contour plot of the fourth derivative of an X wave as seen along its axis of propagation.

Taking the derivatives of the X waves in equation (2) and the Bessel beams in equation (3) in one transverse direction (eg. y axis) what I refer to as a "bow-tie" limited diffraction beam is obtained:

$$\frac{\partial^m}{\partial y^m}\Phi_{X_n}(r,\phi,z-c_1t), \quad (4)$$

and $$\frac{\partial^m}{\partial y^m}\Phi_{J_n}(r,\phi,z-c_1t), \quad (5)$$

where m is a nonnegative integer and is the order of the derivatives. It can be demonstrated that these beams are also exact solutions to the wave equation (1) and they are limited diffraction beams because the propagation term, $z-c_1t$, is retained after the derivatives. As illustrated in FIG. 3, the bow-tie Bessel beam produced by the fourth derivative (i.e. m=4) of equation (5) has the desired high intensity at a focus 5, and its lower intensity sidelobes 6 and 7 extend outward therefrom in opposite directions along the y axis. No sidelobes are produced over large sectors extending along the x axis. As illustrated in FIG. 4, a similar angularly dependent pattern is produced by the bow-tie X wave produced by the fourth derivative (i.e. m=4) of equation (4). A high intensity focused beam 8 is produced along the propagation axis (z axis), and the lower intensity sidelobes 9 and 10 extend outward therefrom in opposite directions along the y axis. Virtually no sidelobes are present over angular sectors extending along the x axis.

The equations for two exemplary limited diffraction beams which have the necessary angular dependency to practice the present invention will now be derived. One of these is based on the X wave equation (2), and the other is based on the Bessel beam equation (3). From these equations transducers can be designed which will produce and/or receive the desired beams.

The integration contained in equation (2) can be evaluated if $B(k)=a_O$ $$\Phi_{XBB_n} = a_0(r\sin\zeta)^n \frac{e^{in\phi}}{\sqrt{M}(\tau+\sqrt{M})^n}, \ (n=0,1,2,\ldots), \quad (6)$$

where the subscript "BB" means broadband, $\Phi_{JBB_n}$ represents an nth-order broadband X wave, and $$M=(r\sin\zeta)^2+\tau^2, \quad (7)$$

and where $$\tau=[a_O-i(z\cos\zeta-ct)]. \quad (8)$$

Because for n>0, the field patterns of both the X wave $\Phi_{XBB_n}$ and Bessel beam $\Phi_{J_n}$ are complex, in the following discussion only the cases where n=0 will be considered. With n=0, equations (6) and (3) are simplified and become rotary symmetric (independent of $\phi$), and represent the zeroth-order X wave and Bessel beam, respectively $$\Phi_{XBB_0} = \frac{a_0}{\sqrt{(r\sin\zeta)^2+[a_0-i(z\cos\zeta-ct)]^2}} \quad (9)$$

and $$\Phi_{J_0} = J_0(\alpha r)e^{i(\beta z-\omega t)}. \quad (10)$$

By substituting equation (9) into equation (4) and let m=4, we obtain the X wave solution:

$$\Phi_{X_{B4}} = a_{X_{B4}} \frac{\partial^4}{\partial y^4}\Phi_{XBB_0}. \quad (11)$$

Similarly, by substituting equation (10) into equation (5) and let m=4, we obtain a Bessel beam solution:

$$\Phi_{J_{B4}} = a_{J_{B4}} \frac{\partial^4}{\partial y^4}\Phi_{J_0}. \quad (12)$$

$\Phi_{X_{Bm}}$ and $\Phi_{J_{Bm}}$ represent the mth-derivative X wave and Bessel beam, respectively, and $a_{X_{Bm}}$ and $a_{J_{Bm}}$ are constants that normalize the peak of the X waves and Bessel beams to one (i.e., $\max\{\Phi_{X_{Bm}}\}=1$ and $\max\{\Phi_{J_{Bm}}\}=1$). The expression of the fourth derivative X wave in equation (11) is:

$$\Phi_{X_{B4}} = a_{X_{B4}} \cdot 3a_0\sin^4\zeta \frac{35y^4\sin^4\zeta-30y^2M\sin^2\zeta+3M^2}{M^{9/2}}, \quad (13)$$

and the expression of the fourth derivative Bessel beam in equation (13) is:

$$\Phi_{J_{B4}} = a_{J_{B4}} \cdot \quad (14)$$

$$\left\{ \left[ -\frac{24\alpha^2y^4}{r^6} + \frac{\alpha^2y^2(24+\alpha^2y^2)}{r^4} - 3\frac{\alpha^2}{r^2} \right] J_0(\alpha r) + \right.$$

$$\left[ 48\alpha \frac{y^4}{r^7} - \frac{8\alpha y^2(6 + \alpha^2 y^2)}{r^5} + \frac{6\alpha(1 + \alpha^2 y^2)}{r^3} \right] J_1(\alpha r) \Bigg\} e^{i(\beta z - \omega t)}.$$

M is given above in equation (7) and the normalization constants are as follows:

$$a_{X_{B4}} = \frac{a_0^4}{9 \sin^4 \zeta}, \tag{15}$$

$$a_{J_{B4}} = \frac{8}{3a^4}. \tag{16}$$

Because a transducer array has only a finite number of separately drivable elements, the aperture weighting function given by equation (13) for a fourth derivative X wave or equation (14) for a fourth derivative Bessel beam must be approximated with piecewise functions. The number of separate elements depends on the spatial frequency of the weighting functions. At locations on the surface of the transducer where the weighting functions have higher spatial frequency, a higher spatial sampling rate and thus a larger number of separately drivable elements are required. Each separate transducer element is driven with an aperture weighting calculated from equation (13) for an X wave or equation (14) for a Bessel beam with z set to zero and the x and y values set to the location of the element's center. When each transducer element is then separately driven with its corresponding aperture weighting function an approximation of the desired fourth derivative X wave or fourth derivative Bessel beam is produced along the z axis. This aperture weighting function employed to drive each transducer element (having equal transmit sensitivity) located at x, y during the transmit time (t) is referred to hereinafter as $h_{x,y}^T(t)$.

When an echo signal is received by the transducer, the separate signals produced by each transducer element can be weighted in the same manner and summed together after correction for differences in element area. According to the principle of reciprocity, the same fourth derivative X wave or fourth derivative Bessel beam response will be obtained. The weighting function for each receiving transducer element is determined from equation (13) or (14) in the same manner described above for transmission, and the result is referred to hereinafter as $h_{x,y}^R(t)$. This weighting function may be convolved with the signal from each transducer element or used to define the impulse response of a filter for the signal.

Figure 5:
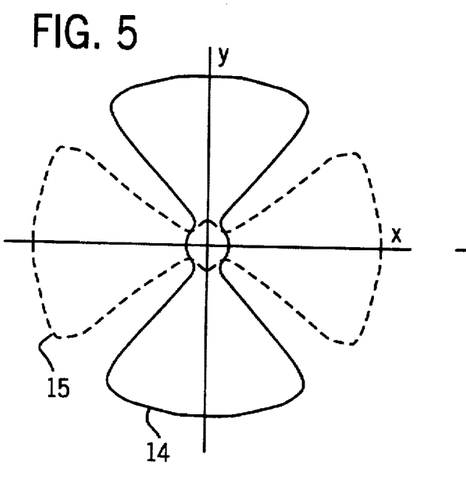
FIG. 5 is a pictorial representation of the transmit field and rotated receive field of an ultrasound system which performs a pulse-echo sequence according to the preferred embodiment of the invention.

To practice the present invention, the aperture weighting function used during transmission of the X wave or Bessel beam is different than that used to receive the echo. Referring to FIG. 5 for example, if the transmit aperture weighting functions $h_{x,y}^T(t)$ are selected to produce an ultrasonic "bowtie" shaped X wave or Bessel beam illustrated generally by the line 14, most of the acoustic energy density is focused at the center along the z axis, and the sidelobes extend vertically along the y axis. However, if the receive aperture weighting $h_{x,y}^R(t)$ is set to receive the same bow-tie shaped X wave or Bessel beam, but it is rotated 90° about the z axis, the transducer will be responsive to echo signals within the reception field indicated generally by dashed line 15. This includes the focused acoustic pressure at the beam center, but it excludes the sidelobes produced during transmission. Stated another way, the desired central region containing the majority of the focused energy overlaps in the transmit and receive apertures, whereas the sidelobes produced during transmission do not overlap the sidelobes seen during reception.

Figure 6:
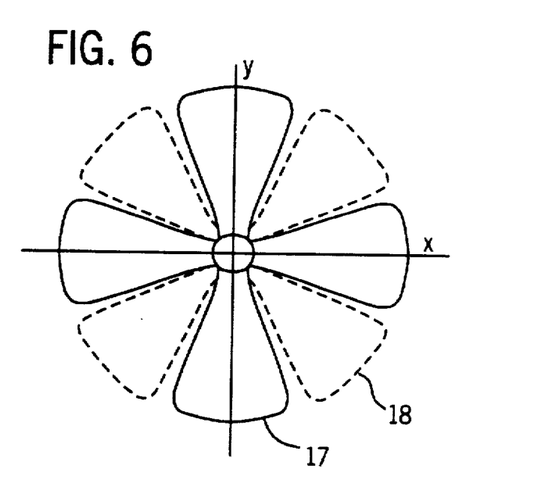
FIG. 6 is a pictorial representation of the transmit field and rotated receive field of an ultrasound system which performs a pulse-echo sequence according to an alternative embodiment of the invention.

While the bow-tie shaped beams are particularly useful to practice the present invention, other beam shapes are also possible. As shown in FIG. 6, for example, a cross shaped beam is produced by taking the derivative of X waves or Bessel beams along both the x and y axes. Such beams are limited diffraction beams. In this case the transmit beam is generated by a transmit aperture function to produce the beam shape indicated generally by solid line 17, and the reception aperture is rotated 45° to receive the beam shape indicated generally by dashed line 18. As with the bow-tie shaped beam, the objective is to provide overlap of the transmit and receive fields at the center containing the majority of the focused acoustic pressure, but not to overlap the transmit and receive sidelobes.

It should be apparent to those skilled in the art that there are many ways to implement the present invention. In the preferred embodiment of the invention described below, the beam is not steered electrically and the number of highvoltage transmit/receive ("T/R") switches are kept to a minimum. However, by using a large number of separate transducer elements and providing a T/R switch for each, the transmit and receive beams can be steered and rotated using well known phased array methods. Reference is made to the J-y. Lu and J. Greenleaf article "A Study of Two-Dimensional Array Transducers for Limited Diffraction Beams, *IEEE Trans. Ultrason., Ferro., and Freq. Control*, Vol. 4, No. 5, pp. 724–739, September 1994, for a detailed explanation of different beam steering techniques as applied to limited diffraction beams.

DESCRIPTION OF THE PREFERRED EMBODIMENT

Figure 7:
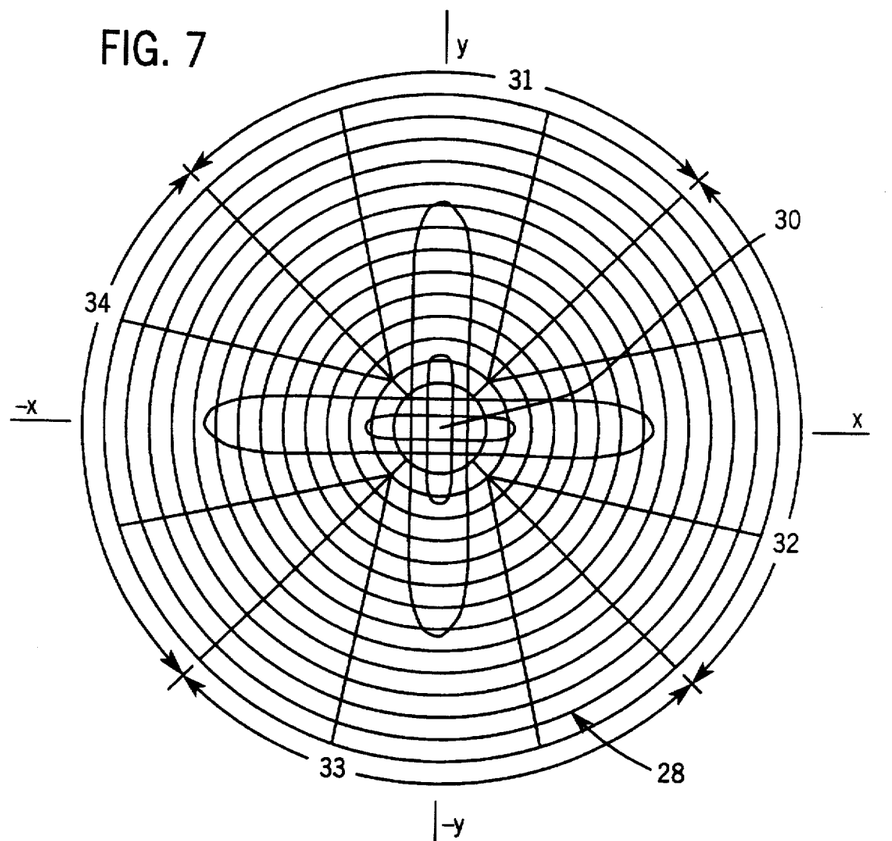
FIG. 7 is a plan view of a preferred embodiment of the acoustic transducer used to practice the invention.
Figure 9:
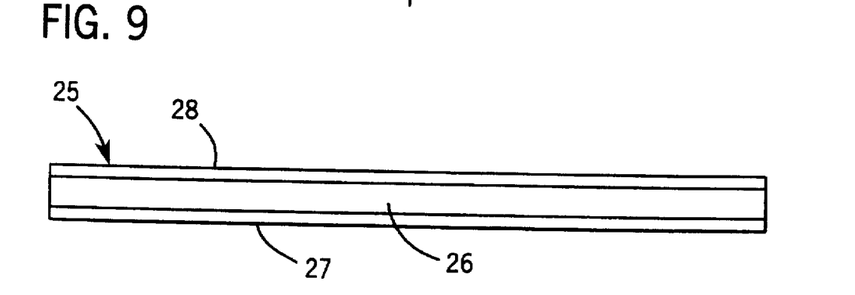
FIG. 9 is a side view of the transducer of FIG. 7.

Referring to FIGS. 7 and 9, the preferred embodiment of the invention employs an ultrasonic transducer 25 which includes an array of separately drivable elements arranged in the pattern shown. The ultrasonic transducer 25 includes a piezoelectric element 26 formed from a piezoelectric material such as lead zirconate titanate which is well-known in the art as "PZT". The piezoelectric element 26 has a thickness which is determined by the speed of sound in the piezoelectric element and the desired center frequency of 2.5 MHz. In the preferred embodiment the element 26 has a thickness of $\lambda/2 \approx 1.0$ mm and a radius of 25 mm, although it is contemplated that commercial embodiments will be smaller and the central frequency will be different. On the front surface of the piezoelectric element 26 is a ground electrode 27. The ground electrode 27 has a circular shape of substantially the same diameter as the element 26 and it is connected to circuit ground of both the transmitter and receiver circuits.

Disposed on the back surface of the piezoelectric element 26 is the active electrode 28. The active electrode 28 is a conductive metal layer which is cut in the pattern shown in FIG. 7 to form an array of separately drivable elements. To reduce "crosstalk" among elements, if PZT is used for the piezoelectric element 26, the PZT is cut along with the borders of the electrode elements 28. If a PZT ceramic/polymer composite material is used for the piezoelectric element 26, crosstalk is not a significant consideration and no cuts therein are needed. Each element is separated from one another by approximately 0.2 mm and electrically insulated from each other. The pattern of the active electrode elements is divided into 5 zones: a central, circular zone 30 comprised of 25 substantially square transducer elements arranged in a two-dimensional array; and four identical sector zones 31–34, extending radially outward from the central zone 30 and disposed symmetrically about the respective y, x −y and −x axes. The sector zones 31–34 each occupy 90° about the transducer's central axis, and the pattern of the electrode elements in each sector 31–34 is identical. As will now be described in more detail, these patterns are designed to produce a limited diffraction beam according to the present invention when sectors 30, 31 and 33 are driven with the appropriate voltages, and to receive a limited diffraction echo beam according to the present invention when sectors 30, 32 and 34 drive appropriately filtered receivers.

The transducer 25 is designed to produce and receive a tenth derivative X wave. By substituting the above equation (9) into equation (4) and letting m=10, the tenth derivative X wave solution is obtained:

$$\Phi_{X_{B10}} = a_{X_{B10}} \frac{\partial^{10}}{\partial y^{10}} \Phi_{X_{BB0}} \qquad (17)$$

The expression of the tenth derivative X wave in equation (17) is as follows:

$$\Phi_{X_{B10}} = a_{X_{B10}} \cdot 14175 a_0 \sin^{10} \zeta \qquad (18)$$

$$\times \left\{ \frac{46189 y^{10} \sin^{10}\zeta - 109395 y^8 M \sin^8 \zeta + 90090 y^6 M^2 \sin^6 \zeta}{M^{21/2}} + \right.$$

$$\left. \frac{-30030 y^4 M^3 \sin^4 \zeta + 3465 y^2 M^4 \sin^2 \zeta - 63 M^5}{M^{21/2}} \right\}.$$

The electrode element pattern used in transducer sectors 31–34 is derived by producing a contour plot of equation (18). The full range of acoustic pressure is divided into seven equal-range levels and a contour of each level is produced. Most of the higher level contours are confined in the central zone 30, but those contour lines outside the central zone 30 and within opposite 90° sectors are used to define electrode element boundaries in sectors 31 and 33. The same bow-tie pattern is rotated 90° and repeated for sectors 32 and 34. In addition, the pattern is further defined by dividing its surface into thirteen equal width annular rings that surround the central zone 30.

Each of the resulting transducer elements in sectors 31 and 33 as well as the elements in the central zone 30 are driven with aperture weighting functions $h_{x,y}^T(t)$ derived from equation (18) as will be described in more detail below to produce the desired ultrasonic pulse. When switched to the receive mode, separate receivers are connected to each element in the central zone 30 and in the two sectors 32 and 34. The receive weighting function $h_{x,y}^R(t)$ for each transducer element in zone 30 and sectors 32 and 34 is calculated from equation (18) after rotating it 90°. This can be performed in a number of ways, but perhaps the easiest is to switch the x and y coordinate values of each element before calculating $h_{x,y}^R(t)$.

Figure 10:
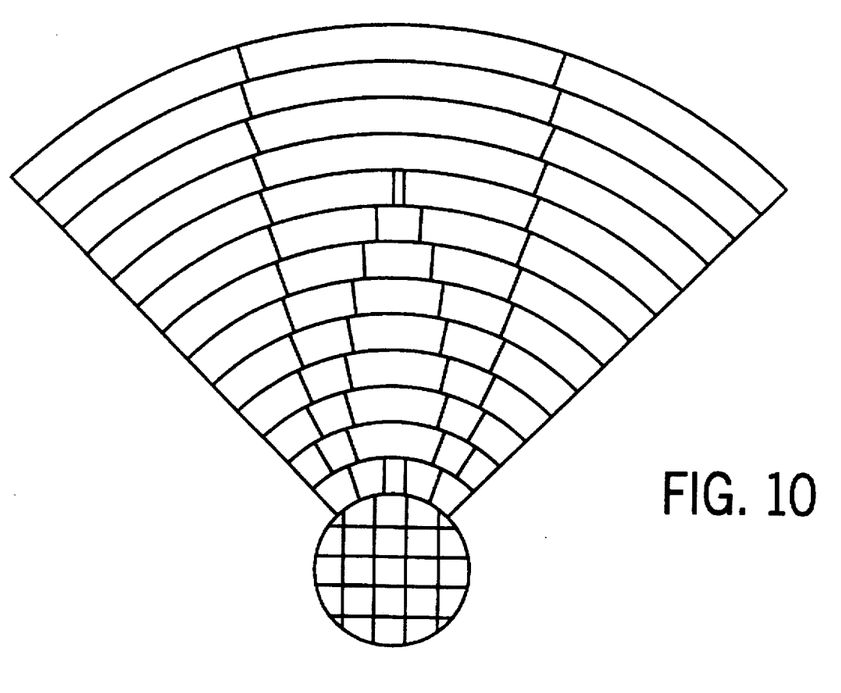
FIG. 10 is a partial view of an alternative embodiment of the acoustic transducer of FIG. 7.

Many refinements or simplifications can be made to the transducer array pattern without significantly affecting performance. The number of elements in the central zone 30 can be increased to improve X wave quality or reduced to lower manufacturing costs. Similarly, the number of annular rings formed in the sectors 31–34 can be either increased or decreased with the same result. If making the smooth contour cuts in each sector 31–34 is too costly, these can be piecewise approximated with radial cuts in each annular ring as shown in the partial view of the pattern in FIG. 10.

Figure 8:
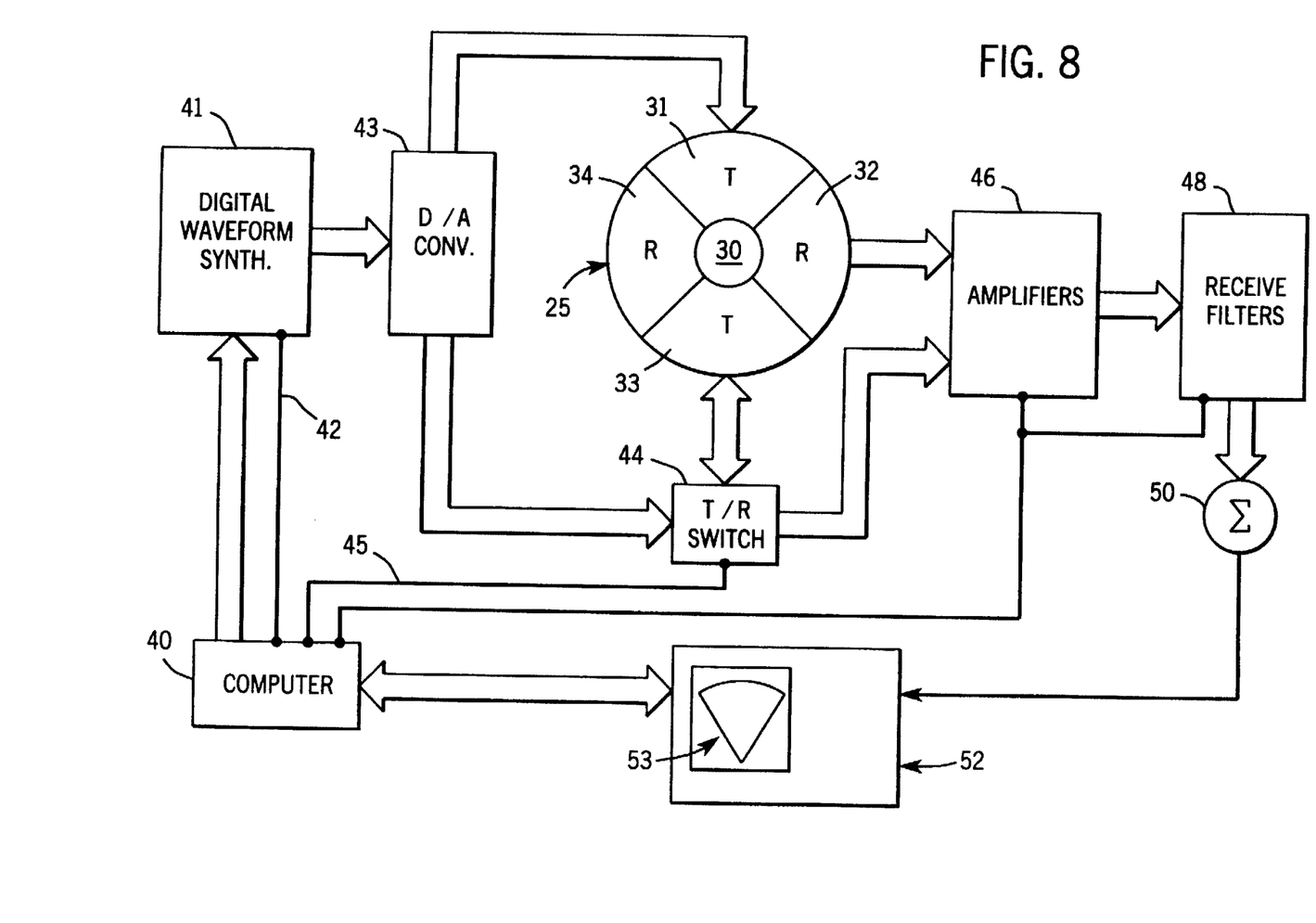
FIG. 8 is an electrical block diagram of an ultrasound system which practices the present invention using the transducer of FIG. 7.

Referring to FIG. 8, an ultrasonic imaging system which practices the preferred embodiment of the invention is operated under the direction of a programmed computer 40. The acoustic transducer 25 is mounted in a mechanical scan head ("wobble") for performing a real-time sector scan. A series of pulse-echo sequences are performed under the control of computer 40 during the sector scan to acquire data from which an image is constructed.

The aperture weighting functions $h_{x,y}^T(t)$ calculated from equation (18) are used during the transmit portion of each pulse-echo sequence. These are stored in separate channels of a digital waveform synthesizer 41 such as that described by J-y. Lu, T-k. Song, R. R. Kinmick and J. F. Greenleaf, "In Vitro and In Vivo Real Time Imaging With Ultrasonic Limited Diffraction Beams," *IEEE Trans. Med. Imaging.*, 12(4):819–29, December 1993. When a transmit triggering signal is received from computer 40 through control line 42, each aperture weighting function is played out as a function of time as a series of digital amplitudes which are applied to corresponding channels in digital to analog converters 43. The resulting analog voltages produced by D/A converters 43 are power amplified to drive the corresponding transducer elements in the central zone 30 and in the sectors 31 and 33 to produce the desired ultrasonic pulse.

The analog voltages for the transducer elements in sectors 31 and 33 are applied directly, whereas the analog voltages for the elements in the central zone 30 are coupled through a set of 44 ale transmit/receive ("T/R") switches 44. The T/R switches 44 are controlled by computer 40 through line 45 to drive the central zone elements 30 during the transmit phase of the pulse-echo sequence, and to apply the received echo signals to corresponding channels of an amplifier 46 during the receive phase.

During the receive phase of each pulse-echo sequence the analog signals produced by transducer elements in central zone 30 and the two sectors 32 and 34 are applied to corresponding channels of amplifier 46. As indicated above, the central zone signals flow through the T/R switches 44, since these transducer elements are also employed during the transmit phase. The gain of each amplifier channel is adjusted to correspond with the area and sensitivity of its associated transducer element, and each amplified transducer element signal is applied to a corresponding channel in a receive filter 48. The filters 48 are designed to implement the receive weighting function $h_{x,y}^R(t)$ for their corresponding transducer element. This can be achieved in a number of ways, but in the preferred embodiment each received echo signal $S_{x,y}(t)$ is digitized, and the digitized signal $S_{x,y}(t_n)$ is applied to the input of a finite-duration impulse response ("FIR") filter. The corresponding receive weighting function $h_{x,y}^R(t)$ is quantized over a finite time period to form respective FIR filter coefficients $h_{x,y}^R(t)$ for n=1 to M. The properly weighted transducer element signals at the output of the FIR filters are then summed together at summing circuit 50, and the resulting focused echo signal is applied to the input of the digital scan converter 52 in an ultrasound scanner, such as the model APOGEE CX commercially available from Interspec, Inc. to produce an image 53.

There are many possible variations that can be made from the preferred ultrasound system described above. For example, the transmit aperture weighting functions $h_{x,y}^T(t)$ can be implemented using analog filters. In such an embodiment, a pulse of appropriate duration is applied to the input of each transducer element filter and the output of each filter is the properly shaped waveform $h_{x,y}^T(t)$ which is applied to the transducer element. Also, all of the transducer elements may be used in both the transmit and receive phases of the pulse-echo sequence, in which case T/R switches 44 must be provided for all the elements. If phase steering of the beam/wave is to be performed, more transducer elements are needed in the steering direction to reduce grating lobes.

Also, in order to reduce the number of separate transducer elements required, sparse array technology may also be employed as described by D. H. Turnball and F. S. Foeter, "Fabrication and Characterization of Transducer Elements in 2-D Arrays for Medical Ultrasound Imaging," *IEEE Trans. Ultrason. Ferroelec. Freq. Contr.*, Vol. 39, No. 4, pp. 464–475, July 1992.

I claim:

1. A method for performing a pulse-echo sequence with a transducer that produces a limited diffraction beam, the steps comprising:

transmitting a limited diffraction beam along a propagation axis through a propagation medium with a transmit aperture that produces an intensity which is maximum in a focal region around the propagation axis, and having sidelobes disposed radially outward from the focal region which are of less intensity than the focal region and which vary substantially in intensity as a function of angle around the propagation axis;

receiving an echo signal propagating in the medium along the propagation axis with a limited diffraction receive aperture that is highly receptive to the echo signal in the focal region around the propagation axis, and which is less receptive to echo signals in sidelobes disposed radially outward from the focal region and varying substantially in intensity as a function of angle around the propagation axis; and wherein the transmit aperture and the receive aperture are oriented about the propagation axis such that there is minimum overlap of their respective sidelobes.

2. The method as recited in claim 1 in which the transducer is an acoustic transducer.

3. The method as recited in claim 1 in which the transmit aperture and the receive aperture are the same, and minimum overlap of their sidelobes is achieved by rotating one of said apertures with respect to the other about the propagation axis.

4. The method as recited in claim 3 in which said one aperture is rotated 90° with respect to said other aperture.

5. The method as recited in claim 3 in which said one aperture is rotated 45° with respect to said other aperture.

6. The method as recited in claim 1 in which the limited diffraction beam is a derivative of a Bessel beam taken along a transverse axis perpendicular to the propagation axis.

7. The method as recited in claim 6 in which the derivative is also taken along an axis perpendicular to the propagation axis and the transverse axis.

8. The method as recited in claim 1 in which the limited diffraction beam is a derivative of an X wave taken along a transverse axis perpendicular to the propagation axis.

9. The method as recited in claim 8 in which the derivative is also taken along an axis perpendicular to the propagation axis and the transverse axis.

10. An ultrasound system for performing a pulse-echo sequence, the combination comprising:

an ultrasonic transducer having an array of separate elements disposed on one of its surfaces;

a transmitter for applying voltages to the separate transducer elements in accordance with a transmit aperture to produce a limited diffraction beam along a propagation axis in a sound medium during a transmit phase;

a receiver connected to receive voltages produced by the separate transducer elements during an echo phase and combine them in accordance with a limited diffraction beam receive aperture; and wherein the limited diffraction beam produced by the transmit aperture and received by the receive aperture has a high intensity region focused around the propagation axis and sidelobes which extend radially outward therefrom and vary substantially in intensity as a function of angle around the propagation axis, the transmit aperture and receive aperture being oriented with respect to each other for minimum overlap of their sidelobes.

11. The ultrasound system as recited in claim 10 in which the transmitter applies voltages to elements on the transducer in a central zone positioned on the propagation axis and to elements located in a first pair of sectors extending radially outward from the central zone in opposite directions from the propagation axis, and the receiver receives voltages from transducer elements in the central zone and from elements located in a second pair of sectors extending radially outward from the central zone in opposite direction from the propagation axis.

12. The ultrasound system as recited in claim 11 in which the transducer elements in the central zone are connected to the transmitter and receiver through T/R switches.

* * * * *

UNITED STATES PATENT AND TRADEMARK OFFICE
CERTIFICATE OF CORRECTION

Patent No.   : 5,492,121
Dated        : February 20, 1996
Inventor(s)  : Jian-Yu Lu It is certified that error appears in the above-identified patent and that said Letters Patent is hereby corrected as shown below:

Column 1, line 5

This invention was made with U.S. Government support awarded by the National Institutes of Health (NIH) Grant Nos.: CA 54212 and CA 43920. The U.S. Government has certain rights in this invention.

Signed and Sealed this

Twenty-ninth Day of July, 1997

Attest:

Attesting Officer

BRUCE LEHMAN

Commissioner of Patents and Trademarks